United States Patent
Becker

(10) Patent No.: US 7,801,480 B2
(45) Date of Patent: *Sep. 21, 2010

(54) PROVIDING INFORMATION ON THE INDIVIDUAL BEARERS' RELATIONSHIPS TO MOBILE TERMINALS RECEIVING A MULTICAST OR BROADCAST SERVICE

(75) Inventor: Ralf Becker, Neu-Isenburg (DE)

(73) Assignee: Panasonic Corporation, Osaka (JP)

( * ) Notice: Subject to any disclaimer, the term of this patent is extended or adjusted under 35 U.S.C. 154(b) by 420 days.

This patent is subject to a terminal disclaimer.

(21) Appl. No.: 11/814,273

(22) PCT Filed: Jan. 20, 2006

(86) PCT No.: PCT/EP2006/000524
§ 371 (c)(1),
(2), (4) Date: Sep. 21, 2007

(87) PCT Pub. No.: WO2006/087067
PCT Pub. Date: Aug. 24, 2006

(65) Prior Publication Data
US 2008/0102749 A1    May 1, 2008

(30) Foreign Application Priority Data
Feb. 16, 2005 (EP) .................................. 05003303

(51) Int. Cl.
*H04H 20/00* (2008.01)
(52) U.S. Cl. .................. 455/3.06; 455/414.1; 455/3.01; 455/456.3
(58) Field of Classification Search ................ 455/3.01, 455/3.02, 3.03, 3.06, 452.2, 452.1, 414.1, 455/517, 67.11, 503, 509, 515, 414.2, 456.5, 455/456.3, 445; 370/352, 354, 312, 389, 370/331; 709/200
See application file for complete search history.

(56) References Cited

U.S. PATENT DOCUMENTS 7,373,178 B2 *   5/2008   Lee ............................ 455/563

(Continued)

FOREIGN PATENT DOCUMENTS

WO        0028760        5/2000

(Continued)

OTHER PUBLICATIONS

International Search Report dated Mar. 2, 2006.

(Continued)

*Primary Examiner*—John Lee
(74) *Attorney, Agent, or Firm*—Dickinson Wright PLLC

(57) ABSTRACT

The invention relates to a method providing a multicast or broadcast service to (the user of) a mobile terminal via a radio access network of a mobile communication system. The multicast or broadcast service is associated to a plurality of bearers for providing the multicast or broadcast service: Further, the invention relates to a mobile terminal for providing a multicast or broadcast service to a user, and to a network entity for providing a multicast or broadcast service to a mobile terminal via a radio access network of a mobile communication system. To enable the correct reception of the broadcast or multicast service at the mobile terminal, the invention proposes to provide the mobile terminal with information on the individual (layered/alternative/complementary) bearers' relationships. The bearers' relationships are provided in service description information for the multicast or broadcast service which indicates the bearers associated to the multicast or broadcast service and predetermined bearer combinations among the plurality of bearers.

28 Claims, 5 Drawing Sheets

U.S. PATENT DOCUMENTS

2004/0076145 A1* 4/2004 Kauhanen et al. ........... 370/352
2005/0064821 A1* 3/2005 Hedberg et al. .......... 455/67.11

FOREIGN PATENT DOCUMENTS

WO 2004051926 6/2004

OTHER PUBLICATIONS

"3GPP TS 23.246 v6.5.0: $3^{rd}$ Generation Partnership Project; Technical Specification Group Services and System Aspects: Multimedia Broadcast/Multicast Service (MBMS); Architecture and Functional Description (Release 6)," XP002335733, 3GPP, www.3gpp.org/ftp/Specs/archive/23_series/23.246/23246-650.zip, pp. 15-18, Dec. 2004.

"3GPP TS 26.346 v1.5.0: $3^{rd}$ Generation Partnership Project; Technical Specification Group Services and System Aspects; Multimedia Broadcast/Multicast Service; Protocols and Codecs (Release 6)," XP002335734, 3GPP, www.3gpp.org/ftp/Specs/archive/26_series/26.346/26346-150.zip, pp. 15-21, Nov. 2004.

* cited by examiner

PROVIDING INFORMATION ON THE INDIVIDUAL BEARERS' RELATIONSHIPS TO MOBILE TERMINALS RECEIVING A MULTICAST OR BROADCAST SERVICE

FIELD OF THE INVENTION

The invention relates to a method providing a multicast or broadcast service to (the user of) a mobile terminal via a radio access network of a mobile communication system. The multicast or broadcast service is associated to a plurality of bearers for providing the multicast or broadcast service: Further, the invention relates to a mobile terminal for providing a multicast or broadcast service to a user, and to a network entity for providing a multicast or broadcast service to a mobile terminal via a radio access network of a mobile communication system.

TECHNICAL BACKGROUND

Recent advances in coding techniques allow for transporting data of a broadcast/multicast service in multiple streams, e.g. alternative (simulcast) or optional (layered multicast). Such approaches have attracted attention of the Internet community for enabling coarse-grained quality adaptation in multicast communication and several works have built on these, as for example DiffServ (Differentiated Services—see Blake et al., "An Architecture for Differentiated Services", RFC 2475, 1998, all RFCs and Internet Drafts by the IETF are available at http://www.ieff.org), RSVP (see Braden et al., "Resource ReSerVation Protocol (RSVP)—Version 1 Message Processing Rules", RFC 2209, 1997), or NSIS (see Hancock, "Next Steps in Signaling: Framework", Internet Draft (draft-ietf-nsis-fw-05.txt), 2003). However, the architecture of 3G communication networks, e.g. like that of 3GPP networks, differs from that of the Internet and thus demands different or additional solutions.

The increasing diffusion of bandwidth-intensive multimedia applications to heterogeneous groups of users led to intensive research in the area of multicast rate and congestion control in the Internet. Since the pioneer work of McCanne et al. (see McCanne et al., "Receiver-driven Layered Multicast", Proceedings of ACM SIGCOMM '96, p. 117 to 130, 1996), multi-rate multicast has been considered as a very promising approach for rate adaptation in streaming scenarios. Techniques have been proposed for transmitting the same content using multiple multicast groups mapping onto different quality levels, based on a cumulative layered data organization (hierarchically encoded) or on stream replication (independent and alternative streams). Moreover, a combination of both approaches is also possible. For example, a session of a single audio stream and several alternative video streams encoded with a standard coding scheme at different data rates or robust to different loss rates could be considered.

Generally, the Internet Multicast Model provides basic mechanisms for distributing data with different QoS parameters to subsets of the multicast distribution trees. The hosts, which communicate with the multicast routers using the Internet Group Management Protocol (IGMP—see Fenner, "Internet Group Management Protocol, Version 2", RFC 2236, available at http://www.ieff.org), can in principle actively adapt the QoS in a sub tree by joining/leaving multicast groups.

However, not all communication networks, e.g. mobile communications networks, follow Internet's end-to-end paradigm. In this regard, compliance to the end-to-end principle means that end hosts are responsible for adaptation to network conditions, relying exclusively on implicit network signaling, i.e., packet drops and delay variations.

Mobile communications networks, on the other hand, usually follow a network-centric approach for QoS provision, resulting in a different Broadcast/Multicast Service Model. Subscribed users are allowed to express their interest on a multicast session by IGMP or similar signaling to dedicated network nodes. The data distribution tree along which service data are provided, however, is build autonomously and modified by the network when necessary, e.g. in response to handover. This approach is advantageous in particular since the radio network controller has the knowledge of available resources (e.g. by providing resource control functionality), and it allows end users to be provided with a more or less seamless service.

Several network-centric approaches for providing heterogeneous communication services in the Internet have also been proposed. A well-known way to implement enhanced functionality within the network is the establishment of transport-level or application-level gateways, or the introduction of active network nodes, as presented in Amir et al. "An application level video gateway", Proceeding of ACM Multimedia '95, San Francisco, Calif., USA, November 1995 or in Metzler et al., "AMnet: Heterogeneous Multicast Services based on Active Networking", Proceedings of the 2nd Workshop on Open Architectures and Network Programming (OPENARCH99), New York, N.Y., USA, March 1999, respectively.

While the former approach imposes significant overhead due to transcoding operations, the latter approach provides a framework that needs to be adapted in each case to provide network-specific functionalities and mechanisms.

The first concept for a heterogeneous QoS in the MBMS Architecture was proposed as Option G in the 3GPP TR 23.846: "Multimedia Broadcast/Multicast (MBMS); Architecture and functional description (Release 6)", V6.1.0, December 2002, available at http://www.3gpp.org (for an overview on the architecture and functional description of MBMS see 3GPP TS 23.246: "Multimedia Broadcast/Multicast (MBMS); Architecture and functional description (Release 6)", V6.2.0, March 2004). The architecture in TR 23.846 defines a MBMS Bearer Service that may include multiple streams (optional or alternative), each mapping to a single RTP instance. Each stream is transported over a unique tunnel between GGSN (Gateway GPRS Support Node) and RNC (Radio Network Controller), which is maintained throughout the duration of a MBMS service.

Thereby, it is in principle possible for a RNC to choose a stream of a MBMS service at session start as well as changing/adding streams during the session. However, in order to allow for this functionality, appropriate mechanisms have to be implemented in the radio access network (RAN). A necessary prerequisite is the communication and management of stream states and relations, which allows a RAN node to choose the (set of) appropriate streams according to the current conditions of a cell or downstream nodes The 3GPP Multimedia Broadcast/Multicast Service (MBMS) Architecture currently only supports a very simple QoS model. It basically provides a non-scalable and non-adaptive service, where either all branches of a MBMS distribution tree are established with the same QoS or the whole service is cancelled. There is no negotiation of QoS values between network nodes, which implies that some of the branches may not be established if QoS requirements cannot be met by the according network nodes. This is relevant both at the beginning of a session or during a session, e.g. at each handover, when a new branch of the distribution tree has to be created/torn down.

On the other hand, mobile terminals are quite heterogeneous with respect to their provided capabilities, i.e., processing power, display size, etc. The current MBMS architecture cannot cope with this heterogeneity or it can by subjecting all terminals (those with better and worse capacity) to a worst case scenario, where all adapt to the lowest quality.

The MBMS Architecture is, however, not optimal in view of accounting and service provision. For example, in case a single user service consisting of a plurality of alternative streams (for example, three different audio streams at different bit rates) or complementary streams (for example, three video streams at different bit rates and two audio stream at different bitrates) is provided using the 3GPP MBMS architecture, each of the alternative streams would need to be provided as three separate MBMS services, each comprising one of the alternative streams.

Likely, considering the provision of complementary streams, there are six different combinations of streams possible. Again, the MBMS architecture would require that each possible combination of streams is provided as a separate MBMS user service to the users. Also in case layered streams are transported, same would be provided in a respective MBMS User Service per layer combination. I.e. for example, when the service media is provided in three layers (base, enhancement 1, enhancement 2) there would need to be established three different MBMS services (base, base & enhancement 1, base & enhancement 1 & enhancement 2).

As indicated above, the lack of an adequate QoS model in MBMS and the implications from the MBMS architecture do not allow for QoS differentiation in individual branches of the distribution tree of a service. Further, the need for several parallel MBMS services required for providing alternative or complementary streams of an, actually, "single" service leads to an increased signaling overhead in the network and wastes, resources in the UMTS network.

The establishment of a conventional MBMS service using the conventional MBMS architecture will be explained in the following with reference to FIG. 4. The UE receives 402 an MBMS User Service description in a service discovery or announcement procedure 401. This MBMS User Service description describes all MBMS bearers contained in the MBMS User Service. The individual bearers are identified by their respective TMGI (Temporary Mobile Group Identifier), which is dynamically allocated in the BM-SC (Broadcast/Multicast Service Center).

An exemplary MBMS User Service description is shown below:

---

```
<?xml version="1.0" encoding="UTF-8"?>
<userServiceDescription
    xmlns="www.example.com/3gppUserServiceDescription"
    xmlns:xsi="http://www.w3.org/2001/XMLSchema-instance"
    serviceId="urn:3gpp:1234567890coolcat">
        <deliveryMethod sessionDescriptionURI=
        "http://www.example.com/3gpp/mbms/session1.sdp"/>
        <deliveryMethod sessionDescriptionURI=
        "http://www.example.com/3gpp/mbms/session2.sdp"/>
</userServiceDescription>
```

---

According to this example, the MBMS User Service description refers to two session descriptions session1.sdp and session2.sdp, which both define a bearer belonging to the MBMS service requested by the user.

Next, the UE activates 403 all MBMS bearers contained in the MBMS User Service Description. It is to be noted that the activation of a bearer is to be understood as setting of a logical state in the distribution tree of the MBMS service to indicate that the respective UE requests the service. The activation of the bearers does not imply the reservation of resources in the network.

As soon as the BM-SC is ready to start the User Service, it sends 404 a MBMS Session Start Request for each bearer of the User Service to the network. In response to the session start procedure, the RNCs send 405 MBMS notifications over the air to inform the UEs of upcoming data transmission. The radio bearer information necessary for the reception of the bearers is included in these notifications. The TMGI is used to identify the respective MBMS bearer. Upon sending the notifications, the RNC allocates the radio resource required for service provision. Based on the information received in the notifications, the UEs may tune in to receive the data which are provided 406, 407 from the BM-SC via the CN/RAN to the UE.

In the 3GPP MBMS architecture, the UEs will activate all bearers (carrying one or more of the individual streams of the service) and will expect that a notification for each bearer is received and that data is provided on each of the bearers belonging to the MBMS User Service. Assuming that a single MBMS service in an enhanced MBMS architecture allows providing a plurality of bearers transporting layered, alternative, or complementary streams within a single user service, it is clear that not all of the bearers listed in the MBMS User Service description need to be simultaneously provided to the UEs.

However, if the UEs do not receive all bearers listed in the 3GPP MBMS User Service description, the UEs will consider this an error in service delivery and will act accordingly.

SUMMARY OF THE INVENTION

It is therefore an object of the invention to overcome the problem described above.

The object is solved by the subject matters of the independent claims. Advantageous embodiments are subject matter to the dependent claims.

One key aspect of the invention is the provision of information on the individual (layered/alternative/complementary) bearers' relationships to the mobile terminals receiving a multicast or broadcast service in order to facilitate a successful service reception. The bearers' relationships may be provided in service description information for the multicast or broadcast service which indicates the bearers associated to the multicast or broadcast service and predetermined bearer combinations among the plurality of bearers.

Each predetermined bearer combination comprises at least one of said plurality of bearers and each predetermined bearer combination provides the multicast or broadcast service at predetermined quality of service parameters. Based on the service description information the mobile terminal may determine whether the at least one bearer indicated in at least one notification received from the network corresponds to one of the predetermined bearer combinations and may appropriately act upon this determination result.

Further, each bearer of the multicast or broadcast service comprises one packet stream of the service (e.g. audio or video). However, it is also possible that more than one packet stream (e.g. audio and video) is provided using a single bearer service.

In accordance with the considerations above, an embodiment of the invention relates to a method for providing a multicast or broadcast service to the user of a mobile terminal via a radio access network of a mobile communication system. In this embodiment, the multicast or broadcast service is associated to a plurality of bearers for providing the multicast or broadcast service.

The mobile terminal may receive service description information for the multicast or broadcast service, wherein the service description information indicates the plurality of bearers associated to the multicast or broadcast service. Further, the service description information indicates predetermined bearer combinations among the plurality of bearers, each predetermined bearer combination comprising at least one of the plurality of bearers and each predetermined bearer combination providing the multicast or broadcast service at predetermined quality of service parameters.

Next, the mobile terminal may activate the plurality of bearers associated to the multicast or broadcast service. It should be noted that the activation of the bearers only indicates the mobile terminal's interest in the respective bearers activated, i.e. indicates the mobile terminal's interest in the multicast or broadcast service. In response to the activation of the plurality of bearers the mobile terminal may receive service notification information that indicates at least one bearer of the plurality of bearers being multicast or broadcast via the air interface of radio access network.

Based on the service description information that have been previously received by the terminal, the mobile terminal may determine whether the at least one bearer indicated in the received service notification information corresponds to one of the predetermined bearer combinations. If this is the case, the mobile terminal may receive content data of the multicast or broadcast service via the at least one bearer indicated in the service notification information and providing the content data to the user of the mobile terminal.

In an exemplary embodiment of the invention, the multicast or broadcast service is a MBMS User Service provided via an UMTS network.

Due to being aware of the "allowed" bearer combinations that provide the multicast or broadcast service, the mobile terminal may also detect situations in which an error is detected due to the notification information not indicating an "allowed" bearer combination. In this respect, the mobile terminal may provide an error message to the user of the mobile terminal, if the at least one bearer indicated in the received service notification information does not correspond to one of the predetermined bearer combinations.

Alternatively, the mobile terminal may wait for the reception of further service notification information before providing the content data of the multicast or broadcast service to the user of the mobile terminal, if the at least one bearer indicated in the received service notification information does not correspond to one of the predetermined bearer combinations and may provide an error message to the user of the mobile terminal, if no further service notification information is received within a predetermined time span.

Thus, the mobile terminal may be implement routines that handle cases where an insufficient number of bearers for a provided quality of service level are provided from the network.

In a further embodiment of the invention, the service notification information further indicates parameters required for receiving the at least one bearer by the mobile terminal. Thus, in addition to identifying the respective bearers on which content data of the multicast or broadcast service is provided the terminal may be further notified on the parameters that enable same to tune to a respective one of the indicated bearers.

Another embodiment of the invention foresees describing the content of the service description information in a markup language, such as for example XML. In a variation of this embodiment, the service description information comprises tags defining the predetermined bearer combinations. In another variation, the service description information may (further) comprise a tag indicating the relationship between the predetermined bearer combinations.

Further, the service description information may further define a priority for each of the predetermined bearer combinations. The definition of combination priorities may indicate the order of desirable bearer combinations in terms of quality of service requirements for alternative bearer combinations. For layered bearer combinations the priority might indicate the order of layers. This enables the mobile terminals to fully understand the user service semantics.

In a further embodiment it is foreseen that the service notification information is provide in at least one notification message. In order to efficiently distribute the service notification information in the radio access network it may be further foreseen that the notification information is provided via a broadcast radio channel.

Another embodiment of the invention relates to the operation of a network entity of the radio access network controlling the radio resources on the air interface of the radio access network. In the UMTS network, this network entity is commonly referred to as the RNC (Radio Network Controller). However, it is to be noted that the network element may be also any other network element of the radio access network which controls the radio resources. For example, in enhanced RAN architectures, this network entity may correspond to a Node B responsible for radio resource control (RRC).

The embodiment relates to a method providing a multicast or broadcast service to a mobile terminal via a radio access network of a mobile communication system. The multicast or broadcast service is again associated to a plurality of bearers for providing the multicast or broadcast service. The network entity may first receive service context information of the multicast or broadcast service from a network entity of the core network of the mobile communication network. This service context information indicates the plurality of bearers associated to the multicast or broadcast service. Further, the service context information indicates predetermined bearer combinations among the plurality of bearers, wherein each predetermined bearer combination comprises at least one of the plurality of bearers and provides the multicast or broadcast service at predetermined quality of service parameters.

As outlined in the introduction, the network entity may comprise a quality-of-service management function and may obtain therefrom (inter alia) quality-of-service constraints indicating a quality-of-service available for downstream transmission on the interface of the network entity through which the service request of the mobile terminal has been received.

With the knowledge of the predetermined quality of service parameters for each of the predetermined bearer combination (as provided by the service context information) the network entity may now select a bearer combination from the predetermined bearer combinations that can be provided within the quality-of-service constraints obtained from the quality-of-service management function.

Next, the network entity may announce the transmission of the multicast or broadcast service on the selected bearers. Therefore, the network entity may for example transmit service notification information indicating the selected bearer combination to the mobile terminal. Further the network entity may continue with transmitting content data of the multicast or broadcast service to the mobile terminal via the at least one bearer of the selected bearer combination.

In a further embodiment of the invention the network element may further allocate radio resources for the transmission of content data via the bearers of the selected bearer combination.

In a variation of the embodiments above, the resource reservation as well as the transmission of the notification information may be preformed after the network entity having received an indication on the start of the multicast or broadcast service, for example in a session start message.

In another embodiment of the invention the network entity may further relay service description information for the multicast or broadcast service to the mobile terminal, wherein the service description information indicates the plurality of bearers associated to the multicast or broadcast service. This service description information may further indicate predetermined bearer combinations among the plurality of bearers. Each predetermined bearer combination may comprise at least one of the plurality of bearers and each predetermined bearer combination may provide the multicast or broadcast service at predetermined quality of service parameters.

Further, an embodiment of the invention foresees that the network entity monitors the quality-of-service constraints indicating the quality-of-service available for downstream transmission for the interface of the network entity through which the service request of the mobile terminal has been received utilizing the quality-of-service management function of the network entity and determines whether the monitored quality-of-service constraints still allow for providing the selected bearer combination to the mobile terminal.

If this is not the case, the network entity may select another bearer combination from the predetermined bearer combinations providable within the quality-of-service constraints obtained from the quality-of-service management function based on the predetermined quality of service parameters for each of the predetermined bearer combination comprised in the service context information. The network entity may transmit service notification information indicating the selected other bearer combination to the mobile terminal, and may further transmit content data of the multicast or broadcast service to the mobile terminal via the at least one bearer of the selected other bearer combination.

In a variation of this embodiment, the network entity may also allocate radio resources for the transmission of content data via the bearers of the selected other bearer combination and may free the radio resources that have been previously allocated for the transmission of content data of the multicast and broadcast service.

In a further embodiment of the invention, the service description information is comprised in a user service description and a service description for each bearer of the plurality of bearers separately provided to the mobile terminal.

In a variation, the user service description indicates an URI of each of the service descriptions associated to the plurality of bearers and defines the predetermined bearer combinations based on the URIs and each service description for a respective one of the plurality of bearers comprises a temporary identifier of the respective bearer. Moreover, in another variation, the service notification information comprises the temporary identifier of each bearer comprised in the selected bearer combination.

Another embodiment of the invention relates to a mobile terminal for providing a multicast or broadcast service to a user. The multicast or broadcast service is transmitted via a radio access network of a mobile communication system and is associated to a plurality of bearers for providing the multicast or broadcast service.

According to this embodiment, the mobile terminal may comprise a receiver for receiving service description information for the multicast or broadcast service. The service description information indicates the plurality of bearers associated to the multicast or broadcast service. Further, the service description information indicates predetermined bearer combinations among the plurality of bearers. Each predetermined bearer combination may comprise at least one bearer of the plurality of bearers. Moreover, each predetermined bearer combination may provide the multicast or broadcast service at predetermined quality of service parameters.

The receiver of the mobile terminal may be further adapted to receive service notification information in response to the activation of the plurality of bearers. The service notification information indicates at least one bearer of the plurality of bearers being multicast or broadcast via the air interface of radio access network.

Further, the mobile terminal may comprise a transmitter for activating the plurality of bearers associated to the multicast or broadcast service, and a processing means for determining whether the at least one bearer indicated in the received service notification information corresponds to one of the predetermined bearer combinations.

The receiver of the mobile terminal may be adapted to receive content data of the multicast or broadcast service via the at least one bearer indicated in the service notification information, if the processing means has determined that the at least one bearer indicated in the received service notification information corresponds to one of the predetermined bearer combinations.

Moreover, the mobile terminal comprised is adapted to provide the content data to the user of the mobile terminal.

In a further embodiment, the mobile terminal further comprises means adapted to perform the steps of the method for providing a multicast or broadcast service to the user of a mobile terminal according to one of the various embodiments and variations thereof above.

Another embodiment of the invention relates to a network entity for providing a multicast or broadcast service to a mobile terminal via a radio access network of a mobile communication system. As in the embodiments above, the multicast or broadcast service is associated to a plurality of bearers for providing the multicast or broadcast service. The network entity may be located in the radio access network and may be adapted to control the radio resources on the air interface of the radio access network.

The network entity may comprise a receiver for receiving a service context information of the multicast or broadcast service from a network entity of the core network of the mobile communication network. This service context information indicates the plurality of bearers associated to the multicast or broadcast service as well as predetermined bearer combinations among the plurality of bearers. Each predetermined bearer combination comprises at least one of the plurality of bearers and may provide the multicast or broadcast service at a predetermined quality of service parameters.

Further the network entity may include a processing means for obtaining from a quality-of-service management function of the network entity quality-of-service constraints indicating a quality-of-service available for downstream transmission on the interface of the network entity through which the service request of the mobile terminal has been received. The processing means may be adapted to select a bearer combination from the predetermined bearer combinations providable within the quality-of-service constraints obtained from the quality-of-service management function based on the predetermined quality of service parameters for each of the predetermined bearer combination comprised in the service context information.

Moreover, the network entity includes a transmitter for transmitting service notification information indicating the selected bearer combination to the mobile terminal, and for transmitting content data of the multicast or broadcast service to the mobile terminal via the at least one bearer of the selected bearer combination.

In a further embodiment, the network entity further comprises means adapted to perform the steps of the method for providing a multicast or broadcast service to the mobile terminal according to one of the various embodiments and variations thereof above.

Another embodiment of the invention relates to a computer readable medium storing instructions that, when executed by a processor of a mobile terminal, cause the provision of a multicast or broadcast service to the user of the mobile terminal via a radio access network of a mobile communication system. The multicast or broadcast service may be associated to a plurality of bearers for providing the multicast or broadcast service.

The mobile terminal may be caused to receive the multicast or broadcast service by receiving a service description information for the multicast or broadcast service, wherein the service description information indicates the plurality of bearers associated to the multicast or broadcast service, wherein the service description information further indicates predetermined bearer combinations among the plurality of bearers, each predetermined bearer combination comprising at least one of the plurality of bearers and each predetermined bearer combination providing the multicast or broadcast service at predetermined quality of service parameters.

The instructions may further cause the mobile terminal to receive the multicast or broadcast service by activating the plurality of bearers associated to the multicast or broadcast service, receiving service notification information in response to the activation of the plurality of bearers, wherein the service notification information indicates at least one bearer of the plurality of bearers being multicast or broadcast via the air interface of radio access network, and determining whether the at least one bearer indicated in the received service notification, information corresponds to one of the predetermined bearer combinations. If so, the instructions may cause the mobile terminal to receive content data of the multicast or broadcast service via the at least one bearer indicated in the service notification information and to provide the content data to the user of the mobile terminal.

In a further embodiment the computer readable medium further stores instructions that, when executed by the processor of the mobile terminal, cause the mobile terminal to execute the steps of the method for providing a multicast or broadcast service to the user of a mobile terminal according to one of the various embodiments and variations thereof above.

Another embodiment of the invention provides a computer readable medium storing instructions that, when executed by a processor of a network entity, cause the network entity to provide a multicast or broadcast service to a mobile terminal via a radio access network of a mobile communication system. The multicast or broadcast service may be associated to a plurality of bearers for providing the multicast or broadcast service. Further, the network entity may be located in the radio access network and controlling the radio resources on the air interface of the radio access network. The instructions, when executed by the processor may cause the network entity to receive a service context information of the multicast or broadcast service from a network entity of the core network of the mobile communication network, wherein the service context information indicates the plurality of bearers associated to the multicast or broadcast service and wherein the service context information further indicates predetermined bearer combinations among the plurality of bearers. Each predetermined bearer combination may comprise at least one of the plurality of bearers and each predetermined bearer combination may provide the multicast or broadcast service at a predetermined quality of service parameters.

Moreover, the instructions may cause the network entity to obtain from a quality-of-service management function of the network entity quality-of-service constraints indicating a quality-of-service available for downstream transmission on the interface of the network entity through which the service request of the mobile terminal has been received, and to select a bearer combination from the predetermined bearer combinations providable within the quality-of-service constraints obtained from the quality-of-service management function based on the predetermined quality of service parameters for each of the predetermined bearer combination comprised in the service context information.

Further, the instructions may cause the network entity to transmit service notification information indicating the selected bearer combination to the mobile terminal, and to transmit content data of the multicast or broadcast service to the mobile terminal via the at least one bearer of the selected bearer combination.

In a further embodiment the computer readable medium further stores instructions that, when executed by the processor of the network entity, cause the network entity to execute the steps of the method for providing a multicast or broadcast service to the mobile terminal according to one of the various embodiments and variations thereof above.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION OF THE INVENTION

Figure 1:
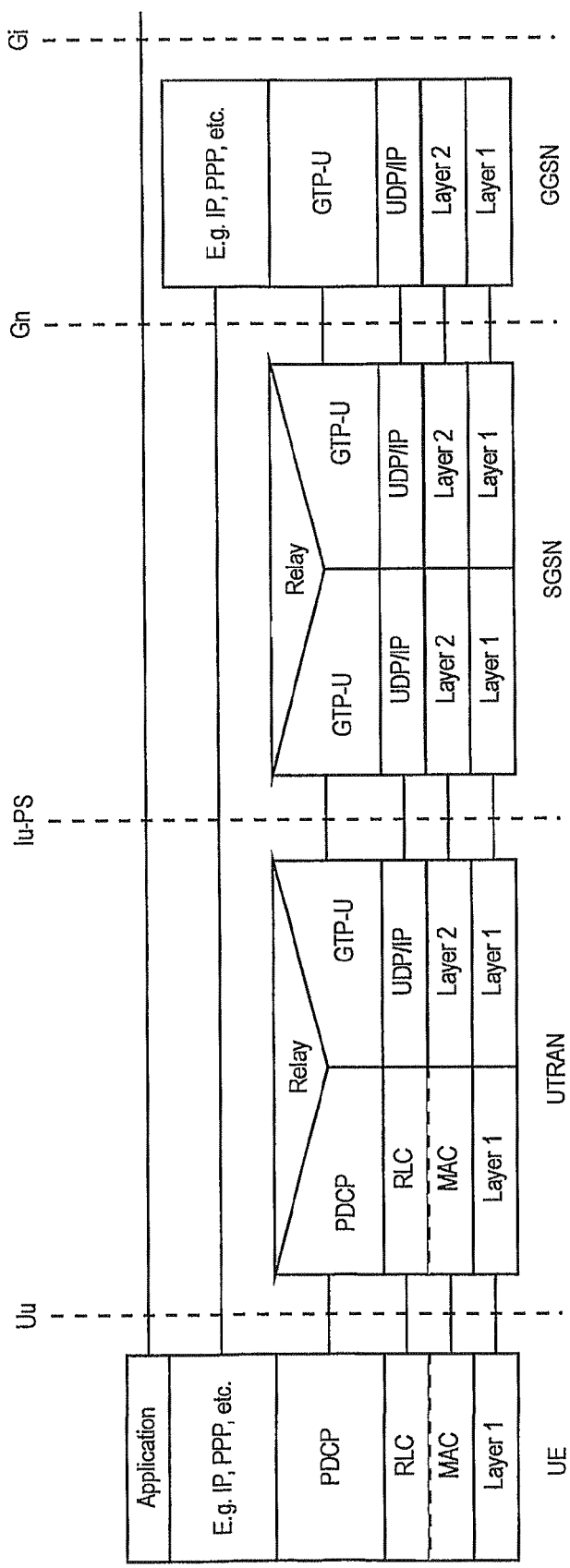
FIG. 1 shows the user plane protocol stack of the 3GPP MBMS architecture respectively.

The following paragraphs will describe various embodiments of the present invention. For exemplary purposes only, most of the embodiments are outlined in relation to a UMTS communication system and the terminology used in the subsequent sections mainly relates to the UMTS terminology. However, the used terminology and the description of the embodiments with respect to a UMTS architecture is not intended to limit the principles and ideas of the present inventions to such systems.

Also the detailed explanations given in the Technical Background section above are merely intended to better understand the mostly UMTS specific exemplary embodiments described in the following and should not be understood as limiting the present invention to the described specific implementations of processes and functions in the mobile communication network.

It is further noted that the present invention is mainly described with respect to bandwidth requirements and the respective to QoS adaptation. However, QoS differentiation and adaptation within the service description information might also be applied to any other QoS parameter, e.g. the loss rate, or a combination of parameters.

In order to enable the provision of a user service with multiple bearers transporting layered, complementary or alternative streams of the service, the MBMS Transport Services and MBMS User Service are enhanced. An important aspect for the design of the enhanced multicast/broadcast service architecture is to cover a wide range of possibilities for content adaptation. For example available adaptive media codecs may be covered and a framework for future extensions may be provided.

One possible approach to overcome the limitations of the current MBMS architecture may be the use of adaptive media codecs. Examples of adaptive media codecs are layered codecs such as MPEG2 or MPEG4. These codecs typically encode media information in (at least) two or more layers, whereby the lowest layer is the most important layer. Following (higher) layers depend on previous (lower) ones.

Content may also be encoded in several independent representations, e.g. using an MPEG-1 encoder that allows providing alternative streams having differing bandwidth requirements or differing error resilience.

Another example of adaptive media codecs is the family of multiple description codecs (MDC). In this type of coding, the content is encoded in several complementary layers, i.e., the concepts of basic layer and dependency on previous layers disappears. In particular the higher the number of MDC-encoded packets received, the higher the quality obtained.

A further design consideration is the availability of RAN (Radio Access Network) resources. Without loosing generality, the RAN may be typically considered being the critical system where the establishment of transport bearers may represent a bottleneck due to scarce radio resources. Thus, an enhanced multicast/broadcast service architecture should consider adaptation functionality to react on changing RAN resources in the RNCs (Radio Network Controllers).

Due to mobility of the UEs, distribution trees might change during an ongoing session. Consequently, an enhanced multicast/broadcast service architecture may allow for both, adaptation at the session start and during a session, e.g. at handovers.

Another possible design aspect for an enhanced multicast/broadcast service architecture is to provide an adaptation for changing conditions in network and radio components. MBMS data may be distributed to multiple users through a MBMS distribution tree that can go through many RNCs and many SGSNs.

Thereby, different media components comprising a single MBMS service from a user's point of view may be provided over separate GTP (GPRS Tunneling Protocol) tunnels (GGSN<->SGSN, SGSN<->RNC—see FIG. 1) and radio bearers (RNC<->UE) enabling QoS differentiation for each component. An enhanced multicast/broadcast service architecture may therefore tackle QoS issues at both the radio access and the core network.

Figure 2:
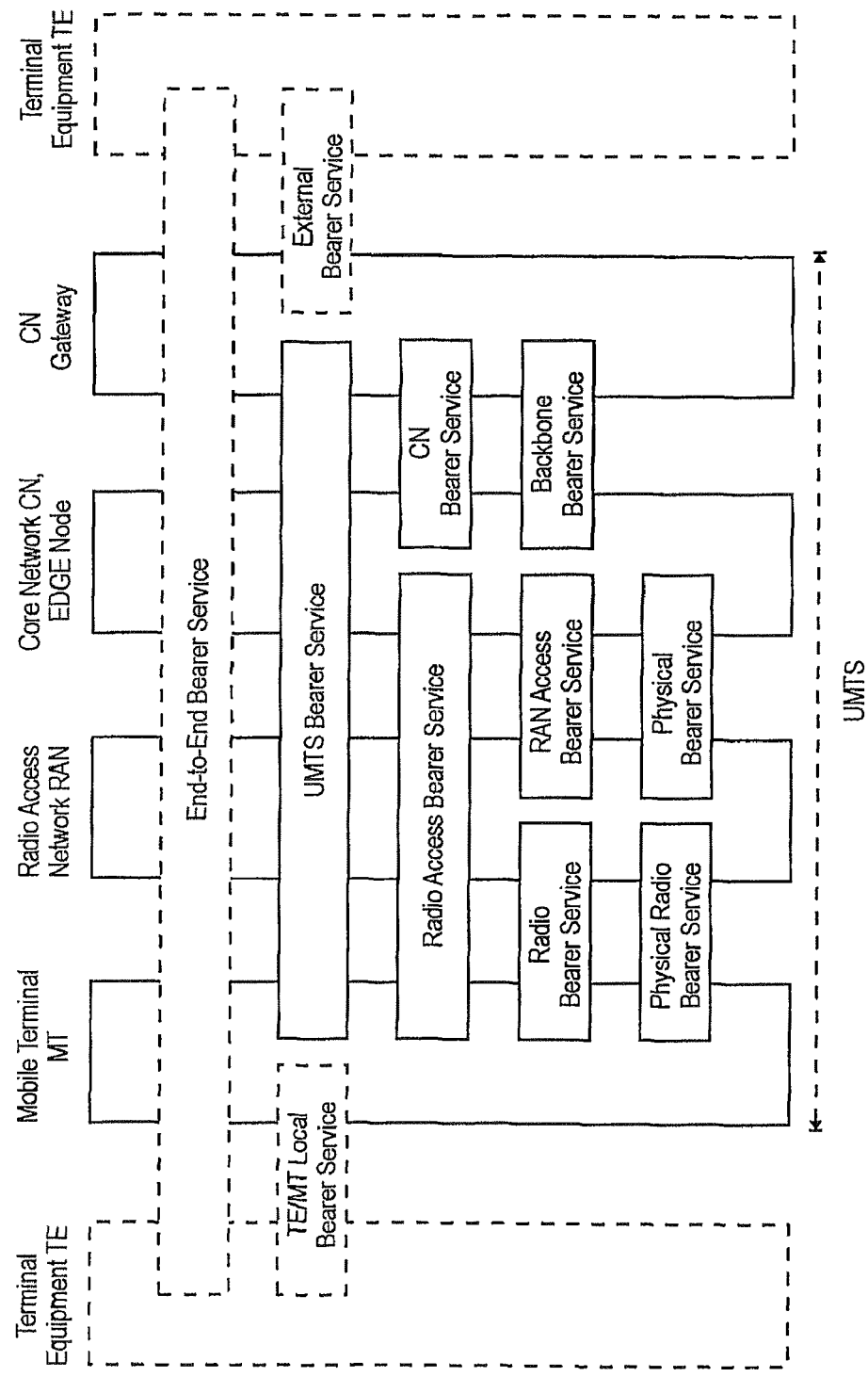
FIG. 2 shows an overview of the QoS architecture of UMTS.

In order to realize a certain network QoS a Bearer Service (e.g. UMTS/MBMS Bearer) with clearly defined characteristics and functionality may be set up from the source to the destination of a user service (e.g. multicast or broadcast service). A bearer service includes all aspects to enable the provision of a contracted QoS. These aspects are among others the control signaling, user plane transport and QoS management functionality. A UMTS bearer service layered QoS architecture is shown in FIG. 2. Each bearer service on a specific layer offers its individual services using services provided by the layers below.

The specific relations of the functions between the nodes (GGSN, SGSN, RNC, etc.) needed to specify, establish, modify and maintain a UMTS Bearer Service with a specific QoS may be implementation specific. This means that several technologies such as DiffServ, IntServ (see Braden et al., "Integrated Services in the Internet Architecture: an Overview", RFC1633, 1994), RSVP or MPLS may be used.

Considering the example of UMTS, the allocation of these functions to the UMTS entities means that these entities may enforce the QoS commitments negotiated for the UMTS bearer service. The specific realization of these functions may be implementation dependent and has only to maintain the specified QoS characteristics. The QoS management functions of all UMTS entities together may ensure the provision of the negotiated service between the access points of the UMTS bearer service.

Figure 3:
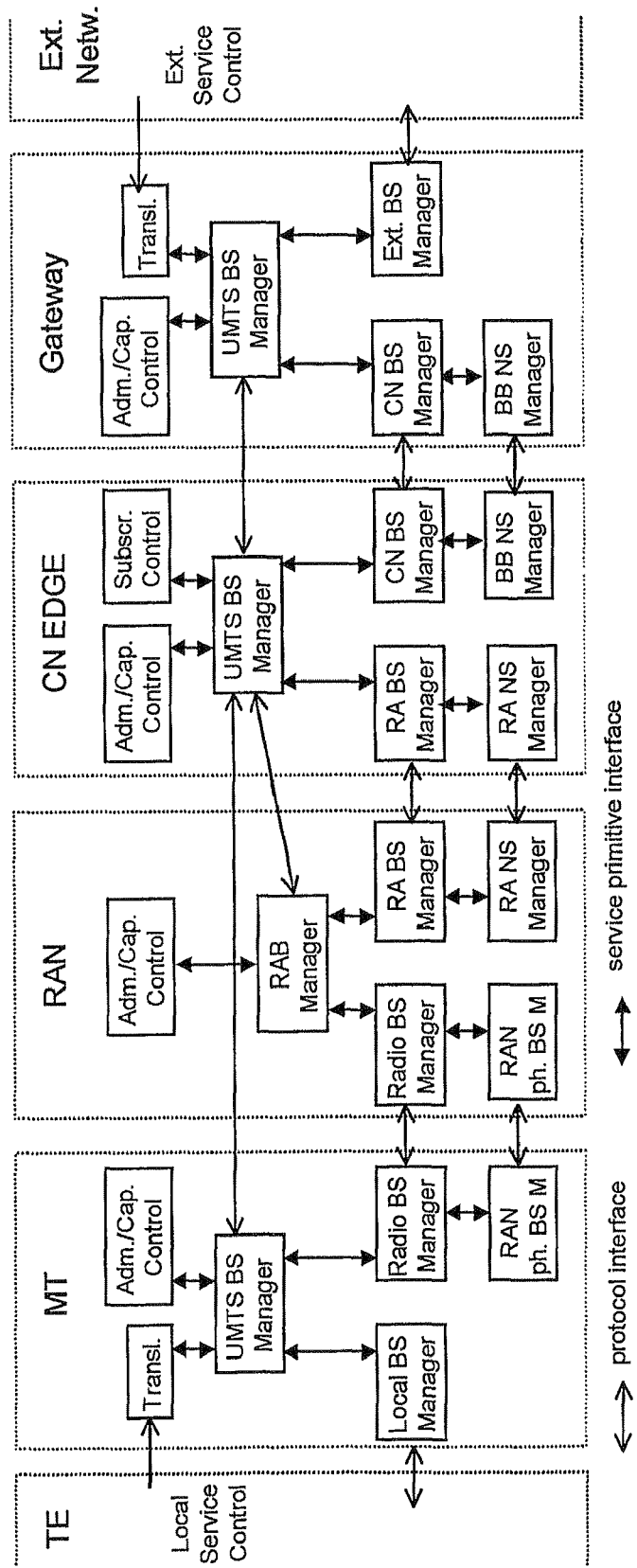
FIG. 3 shows QoS management functions for UMTS Bearer Service in the control plane.
Figure 4:
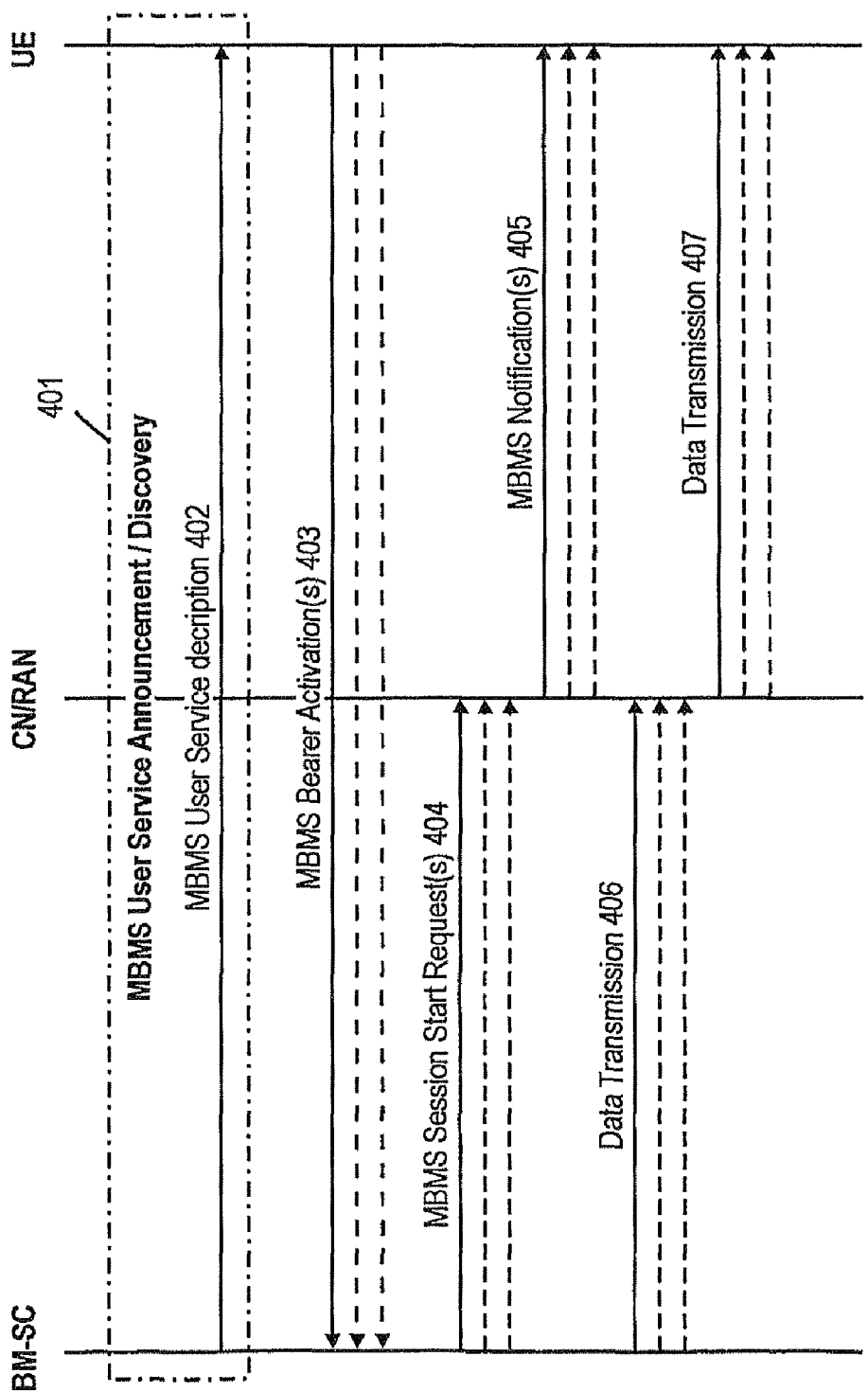
FIG. 4 shows the operation of a conventional 3GPP MBMS user service.

For establishing a new enhanced multicast/broadcast service architecture, the functionality of the Service Manager as described in section 6.2.1.1 of 3GPP TS 23.107: "Technical Specification Group Services and System Aspects; Quality of Service (QoS) concept and architecture (Release 6)" (see version 6.1.0, March 2004) may be of particular interest. The service manager coordinates the functions of the control plane (e.g. MBMS Bearer Context) for establishing, modifying and maintaining the service it is responsible for (see FIG. 3). Further, it provides all user plane QoS management functions with the relevant attributes (e.g. guaranteed bitrate, maximum bitrate, maximum packet size, loss rate, etc.).

The service manager may further offer services to other instances (e.g. MBMS Bearer Context management functions), may signal with peer service managers and may use services provided by other instances. The service manager may further perform an attribute translation (e.g. application packet loss rate to RLC SDU loss rate, SDU Loss rate to Layer 1/Layer 2 block error rate) to request lower layer services. Furthermore, it may interrogate other control functions to receive permission for service provision.

Therefore, it may be assumed that such an underlying infrastructure is provided and that the interaction between the MBMS Bearer and the QoS management functions is given. This allows that both network (CN) and RAN conditions, which are inherently bound to vary due to the uncertainty about how users will make use of the available resources and other unforeseeable events are made known to the context management functions for the MBMS User Service.

E.g. an illustrative example of the latter is the typical flash-crowd phenomena, where a particular server and associated network segment is overloaded by users requests. Another example may be the failure of a node in the service delivery path or the uncertainty about how many users will join multicast services like 3GPP MBMS.

Moreover, another aspect when designing an enhanced multicast/broadcast service architecture is to enable network-driven adaptation of the multicast/broadcast service. In the present MBMS architecture, the MBMS user will typically have little or no chance to negotiate the details of session delivery with the server (e.g. BM-SC). Here is where the network-driven adaptation becomes important.

The QoS architecture is extended such that a differentiation of streams/bearers of a user service becomes possible at the network nodes (network entities) along the distribution tree of the MBMS User Service. In this manner, network-driven adaptation to changing resources, heterogeneous terminals and different network components is possible.

According to this approach, additional state information in form of an MBMS User Service Context is introduced. The MBMS User Service Context stores references to the bearers comprised in a service. Additionally, bearer relation information may be stored which defines the relation between the bearers, so that an adaptation node may perform activation/deactivation of bearers according to the downlink capabilities, e.g. the downstream QoS constraints.

The timeline of an MBMS User Service considered in the following for exemplary purposes only would be as follows: in the data plane, the service's content data (typically in form of optional/alternative/complementary streams) of the requested multimedia broadcast or multicast service is forwarded downstream on their MBMS bearers as long as the QoS requirements (constraints) are met by any of the intermediate network entities. If for example an intermediate node may not forward all bearers belonging to the user service, it filters the bearers by selecting a subset of available bearer services in order to adapt the overall session stream to the available QoS. The relayed context information (e.g. within the MBMS Bearer Context and the newly defined MBMS User Service Context) enables network nodes to perform this filtering. The information necessary to establish the MBMS Bearer Context and the newly defined MBMS User Service Context may be propagated downstream the distribution tree upon request.

The context information may further allow the network to react to sudden capacity changes (up-/downgrades) because the nodes are aware of all options, i.e. possible bearer combinations that would be available for service delivery. The relayed context information describes the options for service configuration, i.e. the service semantics, and it may for example be stored in the MBMS User Service Context. The service semantics may for example comprise information on the bearers belonging to a user service and their inter-relation (layered, alternative, complementary), possible stream combinations—in case of alternative streams—, etc. A further design possibility may be forwarding information on the state of dropped and not dropped streams downstream.

Moreover, it should be further noted that in order to allow an adaption to sudden capacity changes, also the QoS profiles of the streams may be taken into account. This information may be readily available from the MBMS Bearer Context present in the adaption node, which comprises the QoS profile for each established bearer. Alternatively, it may also be considered to signal this information within the service semantics and to store them in the user service context.

Without loss of generality, the radio access network may be considered the bottleneck in the 3GPP architecture and the core network may be considered over-provisioned. It should be noted that the concepts described herein are not to be limited to being applicable only under this assumption. Therefore filter entities (i.e. "adaptation nodes") may be exemplified in the RNCs, since the RNCs have knowledge about the available resources in the own radio domain. This makes them adequate for this functionality.

In general, any network entity in the RAN or CN may act as a filter entity. However, it may be feasible to select those entities as filtering entities that are aware of the resources on the links downstream towards the mobile terminal receiving the requested service.

The initialization of a filter at the adapting network entity may be triggered using control messages. Therefore, the service semantics may be signaled downstream to the corresponding RNC using the MBMS Procedures. Service semantics may be understood as to refer to information on the streams conveying the user service, their inter-relation, and their QoS profiles.

For example, these pieces of information reflecting the service semantics are provided within optional fields of the specified MBMS signaling messages. Furthermore, intermediate nodes such as GGSNs and SGSNs may not need to parse and process the values of the message extensions if they do not understand them. They may only forward them downstream.

Further, the adaptive QoS concept outlined above enables the provision of services supporting different paradigms for encoding a given content, e.g. layered, alternative or complementary. This is a novel approach for providing MBMS Services and, as such, it has not yet been reflected in the current architecture. Presently, only the placeholder for the signaling and management of the necessary MBMS Context information is defined but not how the different possibilities are implemented. The use of an MBMS User Service Context for storing the service semantics (e.g. information on bearers belonging to a service, their inter-relation, their QoS profiles, etc.) is thus compatible with the current MBMS architecture.

The invention assumes that a multicast or broadcast service, such as an MBMS User Service, consists of a plurality of bearers which may be alternative, complementary or layered. Accordingly, each bearer is associated to predetermined QoS constraints which need to be met in order to deliver the respective bearer to the UE. Moreover, the QoS parameters associated to a respective bearer describe not only the bit rate required for delivering the bearer to the UE but also its contents (e.g. guaranteed bitrate, maximum bitrate, maximum packet size, loss rate, etc. of the stream(s) carried by the bearer).

Thus, specific QoS relationships exist between the MBMS bearers (or group of bearers), e.g. alternative, complementary or layered relationships. The QoS of the MBMS User Service is autonomously adapted in the 3G network as discussed above. QoS decision points in the RAN or CN ("adaption nodes") select/drop parts of the MBMS bearers according to available resources in the downlink based on the quality of service constraints obtained from the quality of service management function implemented in the adaption nodes.

The UEs are not aware of this selection/dropping process in the RAN and/or CN and therefore assume to receive all bearers of a MBMS User Service as indicated in the MBMS User Service description. Consequently, the dropped bearers are would be considered an error case by a conventional UE. The UEs are consequently not aware that they actually receive the service at one of the available QoS levels. Therefore UEs cannot receive the MBMS User Service correctly.

The following example is provided for a better understanding of this problem. A MBMS User Service is assumed to contain two MBMS bearers, which represent service alternatives. I.e. each bearer will deliver the same content, but encoded in different quality levels (e.g. audio-visual streams encoded at two different bitrates). Furthermore there might be an associated post-delivery procedure configured for each bearer (e.g. content reception reporting). As the MBMS bearers represent service alternatives only one is indented to be delivered to the UE.

The UE receives the MBMS User Service description, which includes descriptions for both MBMS bearers. According to normal behavior it requests both MBMS bearers. The problem is that the UE is not aware that the MBMS bearers are alternatives and that it is only required to reserve resources for one of them. Therefore it must reserve resources for both bearers (e.g. streaming buffers), which leads to waste of resources in the UE (e.g. memory space). Additionally the UE may start the post delivery procedures for both bearers. However the network is only interested in receiving the post delivery procedures for the service (bearer), which was actually delivered to the UE. This leads to waste of network resources.

The key aspect of an embodiment of the invention is the introduction of a new grouping description as an extension of the standard MBMS User Service description. The MBMS User Service description is based on XML. A new element describes the grouping relations between the individual MBMS bearers, which are contained in the MBMS User Service.

Through this extended description the UEs are aware of MBMS bearer grouping and they know that not all groups of bearers might be received. Hence, the UEs are prepared to receive only a subset of all MBMS bearers. Therefore not receiving a MBMS bearer is not instantly considered an error case. On the other hand the UEs can determine if a complete group is received, which enables the UEs to realize if the MBMS User Service was received correctly.

The following lines show an exemplary XML schema of the conventional MBMS User Service description:

```
<?xml version="1.0" encoding="UTF-8"?>
<xs:schema elementFormDefault="qualified"
targetNamespace="urn:3gpp:metadata:2004:userservicedescription"
    xmlns="urn:3gpp:metadata:2004:userservicedescription"
    xmlns:xs="http://www.w3.org/2001/XMLSchema">
    <xs:element name="userServiceDescription"
    type="userServiceDescriptionType"/>
    <xs:complexType name="userServiceDescriptionType">
        <xs:sequence>
            <xs:element name="name" type="nameType"
                minOccurs="0" maxOccurs="unbounded"/>
            <xs:element name="serviceLanguage" type="xs:language"
                minOccurs="0" maxOccurs="unbounded"/>
            <xs:element name="deliveryMethod"
                type="deliveryMethodType"
                maxOccurs="unbounded"/>
        </xs:sequence>
        <xs:attribute name="serviceId" type="xs:anyURI"
            use="required"/>
    </xs:complexType>
    <xs:complexType name="deliveryMethodType">
        <xs:attribute name="associatedProcedureDescriptionURI"
            type="xs:anyURI" use="optional"/>
        <xs:attribute name="protectionDescriptionURI"
            type="xs:anyURI" use="optional"/>
        <xs:attribute name="sessionDescriptionURI"
            type="xs:anyURI" use="required"/>
    </xs:complexType>
    <xs:complexType name="nameType">
        <xs:simpleContent>
            <xs:extension base="xs:string">
                <xs:attribute name="lang" type="xs:language"
                    use="optional"/>
            </xs:extension>
        </xs:simpleContent>
    </xs:complexType>
</xs:schema>
```

The userServiceDescription is the top-level element comprising all MBMS User Service description information. Most important, the deliveryMethod element collects all information concerning a specific MBMS bearer of the MBMS User Service. All information describing the details of the MBMS bearer is contained in other dedicated metadata descriptions (also refereed to as media and session descriptions). Those are referenced by their unique URI in the deliveryMethod element. Moreover, each of the MBMS bearers listed in the deliveryMethod elements (by means of their associated URIs/media or session descriptions) has a TMGI (Temporary Multicast Group Identifier) associated to the respective bearer. Concerning transport and media encoding parameters these information is contained in a separate SDP description, which is specified in the sessionDescriptionURI attribute of the deliveryMethod element.

The following lines illustrate an exemplary content of dedicated metadata description reverenced within the deliveryMethod element of the XML specification above.

```
v=0
o=user123 2890844526 2890842807 IN IP6
2201:056D::112E:144A:1E24
s=File delivery session example
i=More information
t=2873397496 2873404696
a=mbms-mode: broadcast 1234
a=FEC-declaration: 0 encoding-id=128; instance-id=0
a=source-filter:incl IN IP6 *
2001:210:1:2:240:96FF:FE25:8EC9
a=flute-tsi:3
m=application 12345 FLUTE/UDP 0
c=IN IP6 FF1E:03AD::7F2E:172A:1E24/1
a=lang:EN
a=FEC:0
```

The line relevant for one embodiment of the invention is a=mbms-mode:broadcast 1234 in which it is defined that the MBMS User Service is provided in broadcast mode and is provided with an bearer with the TMGI 1234. Based on this TMGI in the service description referenced by the MBMS User Service description the UE may associate the each URI in the MBMS User Service description with the TMGI of the bearer providing the content data described in the referenced service description. Thus, the TMGIs of the bearers for which a MBMS notification is received at the UE allows the UE to determine whether the bearers identified by their TMGIs form a "valid" bearer combination, as will be described below. It should be noted that for MBMS services in multicast mode the referenced service descriptions may not indicate the bearers' TMGIs.

The following lines show the extensions of the XML schema of the standard MBMS User Service description allowing to support the grouping of MBMS bearers according to an exemplary embodiment of the invention (the bold lines indicate the extensions applied):

```
<?xml version="1.0" encoding="UTF-8"?>
<xs:schema elementFormDefault="qualified"
targetNamespace="urn:3gpp:metadata:2004:userservicedescription"
    xmlns="urn:3gpp:metadata:2004:userservicedescription"
    xmlns:xs="http://www.w3.org/2001/XMLSchema">
    <xs:element name="userServiceDescription"
        type="userServiceDescriptionType"/>
    <xs:complexType name="userServiceDescriptionType">
        <xs:sequence>
            <xs:element name="name" type="nameType"
                minOccurs="0" maxOccurs="unbounded"/>
            <xs:element name="serviceLanguage" type="xs:language"
                minOccurs="0" maxOccurs="unbounded"/>
```

-continued

```
            <xs:element name="deliveryMethod"
                    type="deliveryMethodType"
                    maxOccurs="unbounded"/>
            <xs:element name="qosGroup" type=" qosGroupType"
                    minOccurs="0" maxOccurs="unbounded"/>
        </xs:sequence>
        <xs:attribute name="serviceId" type="xs:anyURI"
                use="required"/>
    </xs:complexType>
    <xs:complexType name="deliveryMethodType">
        <xs:attribute name="associatedProcedureDescriptionURI"
                type="xs:anyURI" use="optional"/>
        <xs:attribute name="protectionDescriptionURI"
                type="xs:anyURI" use="optional"/>
        <xs:attribute name="sessionDescriptionURI"
                type="xs:anyURI" use="required"/>
    </xs:complexType>
    <xs:complexType name="nameType">
        <xs:simpleContent>
            <xs:extension base="xs:string">
                <xs:attribute name="lang" type="xs:language"
                        use="optional"/>
            </xs:extension>
        </xs:simpleContent>
    </xs:complexType>
    <xs:complexType name="qosGroupType">
        <xs:sequence> <!-- re-uses sessionDescriptionURI
                    attribute from delivery-Method element -->
            <xs:element name="qosGroupItem" type="xs:anyURI"
                    maxOccurss="unbounded"/>
        </xs:sequence>
        <xs:attribute name="qosItem" type="xs:anyURI"
                use="optional"/>
    </xs:complexType>
</xs:schema>
```

Two new elements are introduced to describe the grouping relationships between the individual MBMS bearers. These are a qosGroup element, which contains one or more qosGroupItem elements. The qosGroup element is defined on the same level as the deliveryMethod element. The qosGroupItems in a qosGroup define a group of MBMS bearers. The same URI as used in the sessionDescriptionURI attribute of the deliveryMethod element, uniquely identifies the individual MBMS bearer.

Hence, the TMGIs comprised within notification information received by the UE may be used to determine, whether a bearer group according to the definitions in the MBMS User Service description is provided by the network.

Next, another exemplary extension to the XML schema of the standard MBMS User Service description according to another embodiment of the invention is shown below (the bold lines indicate the extensions applied):

```
<?xml version="1.0" encoding="UTF-8"?>
<xs:schema elementFormDefault="qualified"
targetNamespace="urn:3gpp:metadata:2004:userservicedescription"
    xmlns="urn:3gpp:metadata:2004:userservicedescription"
    xmlns:xs="http://www.w3.org/2001/XMLSchema">
    <xs:element name="userServiceDescription"
type="userServiceDescriptionType"/>
    <xs:complexType name="userServiceDescriptionType">
        <xs:sequence>
            <xs:element name="name" type="nameType"
                    minOccurs="0" maxOccurs="unbounded"/>
            <xs:element name="serviceLanguage" type="xs:language"
                    minOccurs="0" maxOccurs="unbounded"/>
            <xs:element name="deliveryMethod"
                    type="deliveryMethodType"
                    maxOccurs="unbounded"/>
            <xs:element name="qosRelation"
                    type="qosRelationType"
                    minOccurs="0" maxOccurss="unbounded"/>
        </xs:sequence>
        <xs:attribute name="serviceId" type="xs:anyURI"
                use="required"/>
    </xs:complexType>
    <xs:complexType name="deliveryMethodType">
        <xs:attribute name="associatedProcedureDescriptionURI"
                type="xs:anyURI" use="optional"/>
        <xs:attribute name="protectionDescriptionURI"
                type="xs:anyURI" use="optional"/>
        <xs:attribute name="sessionDescriptionURI"
                type="xs:anyURI" use="required"/>
    </xs:complexType>
    <xs:complexType name="nameType">
        <xs:simpleContent>
            <xs:extension base="xs:string">
                <xs:attribute name="lang" type="xs:language"
                        use="optional"/>
            </xs:extension>
        </xs:simpleContent>
    </xs:complexType>
    <xs:complexType name="qosRelationType">
        <xs:sequence>
            <xs:element name="qosGroup" type="qosGroupType"
                    maxOccurs="unbounded"/>
        </xs:sequence>
        <xs:attribute name="discrete" type="xss boolean"
                use="optional"/>
    </xs:complexType>
    <xs:complexType name="qosGroupType">
        <xs:sequence> <!-- re-uses sessionDescriptionURI
                    attribute from deliveryMethod element -->
            <xs:element name="qosGroupItem" type="xs:anyURI"
                    maxOccurs="unbounded"/>
        </xs:sequence>
        <xs:attribute name="qosPrio" type="xs:positiveInteger"
                use="optional"/>
        <xs:attribute names="qosItem" type="xs:anyURI"
                use="optional"/>
    </xs:complexType>
</xs:schema>
```

This extension may be used to support the description MBMS bearer group relationships.

There are three new elements to describe the MBMS bearer groups and the relationships between them. A qosRelation element, which is defined on the same level as the deliveryMethod element describes the general relationships between the bearer groups. Those groups can represent discrete alternatives, i.e. one of them is exclusively chosen, or depend on each other, e.g. represent layers of the same media. This is expressed in the discrete attribute of the qosRelation element. A child-element of the qosRelation is the qosGroup element, which specifies the MBMS bearers belonging to a distinct group, like described in the exemplary XML definition above.

The extension proposed in this embodiment is the qosPrio attribute of the qosGroup element, which is needed to express the order of the defined bearer groups. The exact meaning of this order depends on the qosRealtion element. Either it specifies the order of alternatives, e.g. best to worst alternative, or it specifies the order of the dependent groups, e.g. base layer and enhancement layer.

More generally, a MBMS User Service description may be defined as a collection of metadata, which describes the service delivered to the UEs. All necessary parameters to receive the service are contained in this description. The MBMS bearers, which transmit the service content, are described by individual SDP descriptions. Those are referenced in the MBMS User Service description in a deliveryMethod element via a URI. Therefore each deliveryMethod element represents a separate MBMS bearer contained in the MBMS User Service. The URI referencing the SDP description uniquely identifies this MBMS bearer.

A new element in the MBMS User Service description, which is called qosGroup, groups the related MBMS bearers together. Each MBMS bearer contained in such a qosGroup element belongs to the same group of bearers. Those are specified in a new qosGroupItem element, which is a child element of a qosGroup. The URI of the SDP description of each MBMS bearer is used as bearer identifier.

The following XML example illustrates an enhanced MBMS User Service description in accordance with the definitions of the XML schema according to the two exemplary embodiments of the invention shown above:

```
<?xml version="1.0" encoding="UTF-8"?>
<userServiceDescription
    xmlns="www.example.com/3gppUserServiceDescription"
    xmlns:xsi="http://www.w3.org/2001/XMLSchema-instance"
    serviceId="urn:3gpp:1234567890coolcat">
        <deliveryMethod sessionDescriptionURI=
        "http://www.example.com/3gpp/mbms/session1.sdp"/>
        <deliveryMethod sessionDescriptionURI=
        "http://www.example.com/3gpp/mbms/session2.sdp"/>
        <deliveryMethod sessionDescriptionURI=
        "http://www.example.com/3gpp/mbms/session3.sdp"/>
        <deliveryMethod sessionDescriptionURI=
        "http://www.example.com/3gpp/mbms/session4.sdp"/>
        <qosGroup>
            <qosGroupItem>
            http://www.example.com/session1.sdp
            </qosGroupItem>
            <qosGroupItem>
            http://www.example.com/session2.sdp
            </qosGroupItem>
        </qosGroup>
        <qosGroup>
            <qosGroupItem>
            http://www.example.com/session3.sdp
            </qosGroupItem>
            <qosGroupItem>
            http://www.example.com/session4.sdp
            </qosGroupItem>
        </qosGroup>
</userServiceDescription>
```

There are four deliverMethod elements present in the description. This means that the MBMS User Service consists of four MBMS bearers. Additionally two groups are specified by two qosGroup elements. In this example each group contains two of the MBMS bearers, which is expressed by the two qosGroupItem elements containing the URI of the SDP description of the respective bearer.

Using the extended MBMS User Service description as proposed in the exemplary XML definitions above the UEs receiving a MBMS User Service delivering layered, complementary or alternative layers know the grouping relations between the individual MBMS bearers and are aware that an autonomous QoS adaptation might be performed in the network. Therefore the UEs are prepared to receive only a subset of all MBMS bearer contained in the MBMS User Service description. They can determine if a group is received completely, which enables the UEs to correctly receive the MBMS User Service.

The exemplary XML schemes above do not only resolve the problem of identifying MBMS bearers belonging to a certain group, but they may also define how these groups are interrelated (e.g. represent alternatives or layers).

In respect, the second XML schema proposed above introduces the description of the group inter-relationships. This is achieved by a new qosRelation element and an extension of the qosGroup element. The qosRelation element specifies the general group relations, i.e. if the groups either represent separate media alternatives or belong to different layers of the same media. And the qosPrio attribute of the qosGroup element specifies the group hierarchy. This is either the order of the alternatives (e.g. best to worst alternative) or the order of the layers (e.g. base and enhancement layer), depending on the qosRelation element.

The following example illustrates the extensions:

```
<qosRelation discrete="true">
    <qosGroup qosPrio="1">
        <qosGroupItem>
        http://www.example.com/session1.sdp
        </qosGroupItem>
        <qosGroupItem>
        http://www.example.com/session2.sdp</qosGroupItem>
    </qosGroup>
    <qosGroup qosPrio="2">
        <qosGroupItem>
        http://www.example.com/session3.sdp
        </qosGroupItem>
        <qosGroupItem>
        http://www.example.com/session4.sdp
        </qosGroupItem>
    </qosGroup>
</qosRelation>
```

The qosRelation element in the example above shows that the described groups are to be treated discrete, i.e. represent service alternatives. The qosPrio attribute shows that the first described group is the preferred one.

In the exemplary embodiment above, the UE will receive a MBMS notification message for each bearer that has been selected by its RNC for providing the content data of the respective bearers as defined in the metadata descriptions referenced in the MBMS User Service description. The UE is aware of the TMGIs of the bearers providing the service, as—for example—same have been received in MBMS notification message(s) via a paging channel. Comparing the received TMGIs of the notification(s) with those defined by the respective descriptions referenced in the qosGroupItem elements of the respective qosGroup elements of the MBMS User Service description, the UE recognizes whether all bearers necessary to receive the service in a predetermined (bearer) configuration have been received.

If the MBMS notifications announce a bearer combination defined in the MBMS User Service description, the UE may receive the content data provided on the bearer(s) and may provide the content to the user of the UE, for example by displaying the received video data, replaying a received audio signal, etc.

If the MBMS notifications do not announce a bearer combination defined in the MBMS User Service description, the UE may follow different strategies to cope with the situation. For example, the UE may indicate to the user that the service may not be provided, i.e. an error message may be triggered. Alternatively, the UE may await the reception of further notifications which possibly "complete" the set of indicated MBMS bearers of the MBMS User Service, such that the indicated bearers correspond to a bearer combination indicated in the MBMS User Service description. A timer may for example be used to ensure that a "valid" bearer combination is indicated to the UE within a predetermined time period. Upon expiry of the timer, the UE may decide to trigger an error message.

Figure 5:
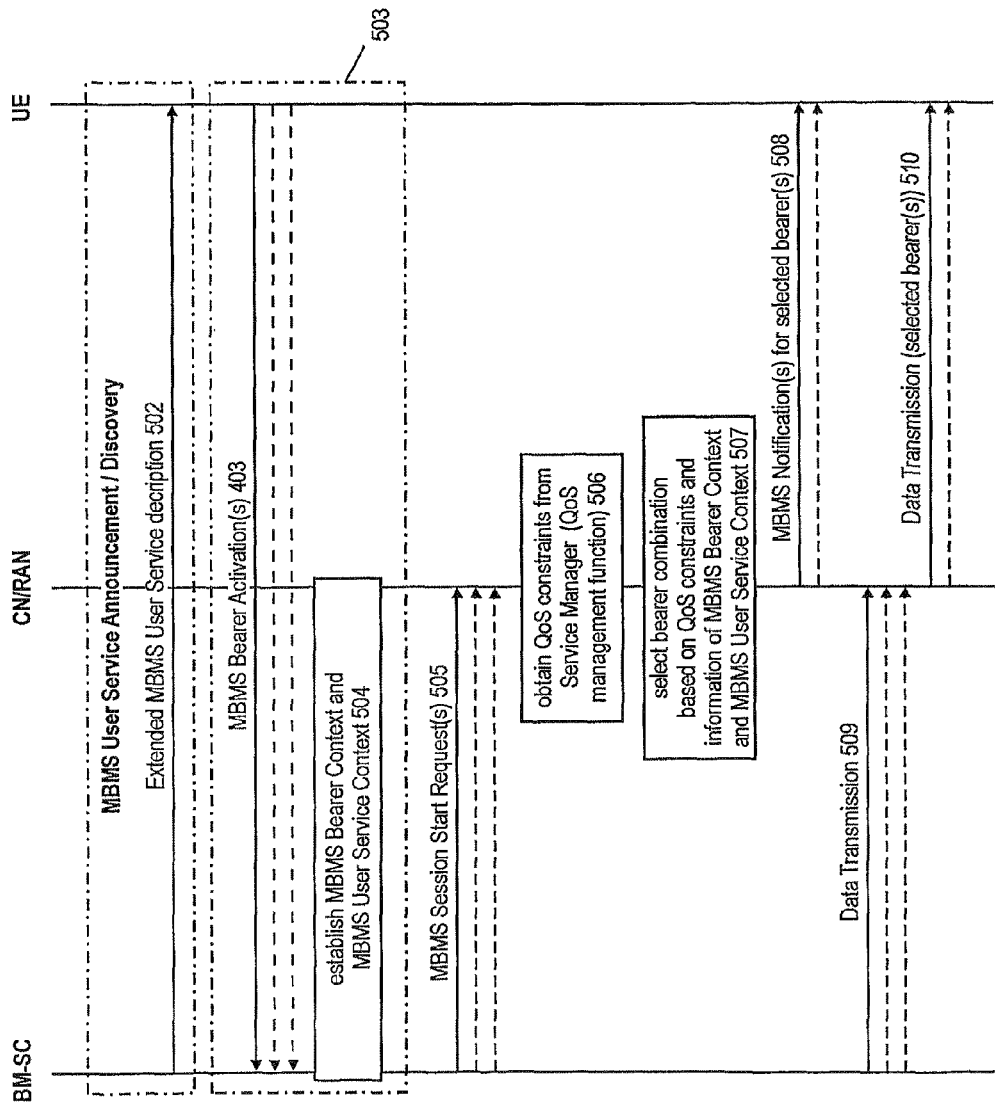
FIG. 5 shows the operation of a MBMS user service according to an embodiment of the invention.

In the following paragraphs, an exemplary operation of an MBMS multicast service in accordance with an exemplary embodiment of the invention will be outlined with reference to FIG. 5. The provision of an MBMS broadcast service is similar, except for not requiring the execution of the subscription, joining and leaving procedures as briefly outlined below.

In a first step the relationship between the user and a service provider which allows the user to receive the related MBMS multicast service is established. The so-called Service Subscription is the agreement of a user to receive a service offered by service provider. The service provider records the subscription information in the appropriate database in the network operator's network. (In UMTS a service provider may be a 3$^{rd}$ party, but MBMS is controlled by the network operator.)

The next step is the MBMS user service announcement/discovery mechanism 401. This mechanism allows users to request or to be informed about the range of MBMS user services available. The available service may be for example operator specific MBMS user services as well as services from content providers outside of the PLMN.

The service announcement is used to distribute to users information about the service, parameters required for service activation (e.g. IP multicast address) and possibly other service related parameters (e.g. service start time). Commonly, this information is provided 502 in form of an Extended MBMS User Service description according to the embodiments of the invention described above.

According to an embodiment of the invention, it is possible to use several service discovery mechanisms, which include standard mechanisms such as SMS, or depending on the capability of the individual UE, applications that encourage user interrogation. The method chosen to inform users about MBMS User Services available may account for the user's location. For example, CBS (Cell Broadcast Service), MBMS Broadcast mode to advertise MBMS Multicast and Broadcast user Services, MBMS Multicast mode to advertise MBMS Multicast user Services, PUSH mechanisms such as WAP, SMS-PP or MMS, URL (e.g. via HTTP, FTP), etc. may be used for MBMS user service announcement mechanisms.

Next, MBMS activation 503 by a user is performed. By this process a subscriber joins a multicast group, i.e. the user indicates 403 to the network that he/she is willing to receive multicast mode data of a specific MBMS bearer service.

The MBMS multicast service activation procedure registers the user in the network to enable the reception of data from a specific multicast MBMS bearer service. The activation is a signaling procedure between the UE and the network. The procedure may establish MBMS UE contexts in UE, SGSN and GGSN and RNC for each activated multicast MBMS bearer service.

In the service activation procedure, the UE may for example indicate the IP multicast addresses of the MBMS bearers (bearer services) of a MBMS User Service it desires to receive to the BM-SC. In the subsequent signaling between the BM-SC and the UE, the UE is provided with the TMGIs of the indicated MBMS bearers. Thus, in the case of multicast services, the IP multicast addresses of the bearer services in their media or session description (referenced by the MBMS User Service description) may be used to establish a mapping between the bearer inter-relationships and their grouping to the TMGIs of the bearers.

In this signaling of the MBMS activation procedure 503 also the MBMS Registration procedures are executed. The MBMS Registration is the procedure by which a downstream node informs an upstream node that it would like to receive session attributes and data for a particular MBMS bearer service in order to distribute it further downstream. This procedure builds up a distribution tree for the delivery of MBMS session attributes and data from the BM-SC to the UEs interested in the service and establishes the MBMS Bearer Context in the network nodes in the distribution tree. For each bearer (MBMS bearer service) of the MBMS User Service a MBMS Bearer Context is established 504 in the network nodes. The MBMS Bearer Context comprises inter alia the QoS required for the respective MBMS bearer service as well as the minimum bearer capabilities the UE has to support.

However the network nodes are not aware of the bearers belonging to a single MBMS User Service or of their relationship. The MBMS Registration procedures may be adapted to establish 504 a MBMS User Service Context described below in the network nodes along the distribution tree which provides the networks nodes with information on the inter-relation of the MBMS bearer services. The MBMS User Service Context which is also established in the RNC serving a UE requesting the MBMS service reflects the session semantics, i.e., it provides information about the bearer relations and describes additional bearer properties. The following tables illustrate the content of this context according to an exemplary embodiment of the invention.

TABLE 1

MBMS User Service Context

| Parameter | Description/Value |
|---|---|
| MBMS User Service ID | Identifier of the MBMS User Service. The MBMS User Service ID identifies for example the different IP multicast addresses of streams belonging to the service. |
| Bearers IE | Information Element on each MBMS Bearer (see below) composing the MBMS User Service. This field contains at least a description for one bearer. |

Each bearers information element may comprise different fields dependent on the bearers' interrelation. For each exemplified type (layered, alternative and, complementary) the information element will be described below.

TABLE 2.1

Bearer IE for Layered Bearers

| Type of Bearers | Type of relation between the bearers (e.g. layered, alternative, complementary, or void) to the other bearers in the MBMS service. If "void" the service consists of just one bearer. |
|---|---|
| Bearer List | This is a list containing Bearer List Elements (LEs) describing each a bearer of the type specified in the above field. |

TABLE 2.2

Bearer List Element for Layered Bearers

| MBMS Bearer ID | Identifier of the MBMS Bearer, for example the IP Multicast Address for identifying the MBMS Bearer context. Identifiers other than an IP Multicast Address may be used. |
|---|---|
| Forwarding State | List containing the Forwarding State of the stream in this MBMS Bearer (e.g. "forward" or "drop") for each downstream node. A network node may have several downstream nodes (e.g. several RNCs attached to an SGSN) to which the stream may or may not be forwarded. For each of the downstream node interfaces, the forwarding state of this stream/bearer is specified in this list. |
| Priority | The priority of the MBMS Bearer. |

TABLE 3.1

Bearer IEs for Alternative Bearers

| | |
|---|---|
| Type of Bearers | Type of relation between the bearers (e.g. layered, alternative; complementary, or void) to the other bearers in the MBMS service. If "void" the service consists of just one bearer. |
| Bearer List | This is an array containing Bearer List Elements (LEs) each describing a bearer of the type specified in the above field. |
| Default Bearer Combination | This field identifies the default bearer or combination of bearers for the MBMS User Service. |
| Alternative Bearer Combinations | This field identifies which combinations (using the bearer identifiers) of bearers are reasonable alternatives to the default option above. The alternative bearer combinations may define, e.g, lower bandwidth bearer combinations. Other combinations may, e.g. define combinations of the bearer in a language different from that of the default option. Further, region-based combinations may be expressed to fit the bearer combination to the region where the MBMS service is offered in, e.g. location based services. |

TABLE 3.2

Bearer List Element for alternative Bearers

| | |
|---|---|
| MBMS Bearer ID | Identifier of the MBMS Bearer, for example the IP Multicast Address for identifying the MBMS Bearer context. Other identifiers are possible. |
| Forwarding State | List containing the Forwarding State of the stream in this MBMS Bearer (e.g. "forward" or "drop") for each downstream node. A network node may have several downstream nodes (e.g. several RNCs attached to an SGSN) to which the stream may or may not be forwarded. For each of the downstream node interfaces, the forwarding state of this stream is specified in this list. |

TABLE 4.1

Bearer IE for Complementary Bearers

| | |
|---|---|
| Type of Bearers | Whether bearers are layered, alternative, complementary or other. Type of relation between the bearers (e.g. layered, alternative, complementary, or void) to the other bearers in the MBMS service. If void the service consists of just one bearer. |
| Bearer List | This is an array containing Bearer List Elements (LEs) describing each a bearer of the type specified in the above field. |

TABLE 4.2

Bearer List Element for Complementary Bearers

| | |
|---|---|
| MBMS Bearer ID | Identifier of the MBMS Bearer, for example the IP Multicast Address for identifying the MBMS Bearer context. Other identifiers are possible. |
| Forwarding State | List containing the Forwarding State of the stream in this MBMS Bearer (e.g. "forward" or "drop") for each downstream node. A network node may have several downstream nodes (e.g. several RNCs attached to an SGSN) to which the stream may or may not be forwarded. For each of the downstream node interfaces, the forwarding state of this stream is specified in this list. |

When maintaining the MBMS User Service Context above, the RNC is aware of the different combinations of bearers that are possible to provide the MBMS User Service as well as of their required QoS (MBMS Bearer Context).

In the next step 505, the BM-SC is ready to send data—session start. The session start may occur independently of the activation of the service by the user. The session start procedure triggers the reservation of bearer resources for MBMS data transfer in the network. Subsequently, the BM-SC proceeds with transmitting 509 the service content downstream.

Through the session start procedure, MBMS session attributes such as QoS, estimated session duration if available are provided to the GGSN(s) and SGSN(s) that have previously registered for the corresponding MBMS bearer service and to all RNCs that are connected to a registered SGSN.

According to one embodiment of the invention, the RNC serving the UE requesting the MBMS User Service may request 506 the resources available on its interface towards the UE from its quality of service management function. This function provides the RNC with the QoS constraints on the downstream towards the UE for service provision. Based on the information obtained from the quality of service management function and its knowledge of the bearer relations (MBMS User Service Context) and their respective QoS requirements (MBMS Bearer Context), the RNC may select 507 a MBMS bearer combination which may be provide the requested MBMS User Service to the UE within the QoS constraints obtained from the quality of service management function. The RNC may thereby obtain the QoS constraints on all interfaces through which UEs have previously requested the service and may select for each of the interfaces (cells) an bearer combination that satisfies the respective QoS constraints.

Having selected the appropriate bearer combinations for each cell, the RNC may broadcast 508 MBMS notifications for the selected MBMS bearers to inform the UEs having requested the service on forthcoming (and potentially about ongoing) transmission of the respectively selected MBMS bearers. If not yet being transmitted, the RNC may start the multicast of content data on the selected MBMS bearers of the MBMS User Service.

A UE having announced its interest in a MBMS service will receive the MBMS notifications for the selected bearers in its cell and will start content data reception 510 from the selected bearers. Due to being informed on the bearer interrelations by means of the MBMS User Service description, the UE may recognize whether "valid" bearer combination is provided, as explained above.

To complete the sequence of procedures performed in MBMS User Service provision, the session stop procedure is explained next. The BM-SC (Broadcast/Multicast-Service Center) initiates the MBMS Session Stop procedure when it considers the MBMS session to be terminated. The session is typically terminated when there is no more MBMS data expected to be transmitted for a sufficiently long period of time to justify a release of bearer plane resources in the network. The procedure is propagated to all SGSNs and GGSNs that are registered for the corresponding MBMS bearer service and to RNCs that have an established Iu bearer plane with an SGSN.

By means of a leaving procedure the UE may terminate the reception of a MBMS multicast service. This MBMS multicast deactivation by the user is the process by which a subscriber leaves (stops being a member of) a multicast group, i.e. the user no longer wants to receive Multicast mode data of a specific MBMS bearer service.

Another embodiment of the present invention relates to the implementation of the above described various embodiments using hardware and software. It is recognized that the various above mentioned methods as well as the various logical blocks, modules, circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible, The software modules may be stored on any kind of computer readable storage media, for example RAM, EPROM, EEPROM, flash memory, registers, hard disks, CD-ROM, DVD, etc.

The invention claimed is:

1. A method providing a multicast or broadcast service to the user of a mobile terminal via a radio access network of a mobile communication system, wherein the multicast or broadcast service is associated to a plurality of bearers for providing the multicast or broadcast service, the method comprising the following steps executed by the mobile terminal:
   receiving a service description information for the multicast or broadcast service, wherein the service description information indicates the plurality of bearers associated to the multicast or broadcast service and
   wherein the service description information further indicates predetermined bearer combinations among the plurality of bearers, each predetermined bearer combination comprising at least one of said plurality of bearers and each predetermined bearer combination providing the multicast or broadcast service at predetermined quality of service parameters,
   activating the plurality of bearers associated to the multicast or broadcast service,
   receiving service notification information in response to the activation of the plurality of bearers, wherein the service notification information indicates at least one bearer of said plurality of bearers being multicast or broadcast via the air interface of radio access network,
   determining whether the at least one bearer indicated in the received service notification information corresponds to one of said predetermined bearer combinations, and
   if so, receiving content data of the multicast or broadcast service via said at least one bearer indicated in the service notification information and providing the content data to the user of the mobile terminal.

2. The method according to claim 1 wherein the multicast or broadcast service is a MBMS User Service provided via an UMTS network.

3. A mobile terminal for providing a multicast or broadcast service to a user, the multicast or broadcast service being transmitted via a radio access network of a mobile communication system, wherein the multicast or broadcast service is associated to a plurality of bearers for providing the multicast or broadcast service, the mobile terminal comprising:
   a receiver for receiving a service description information for the multicast or broadcast service, wherein the service description information indicates the plurality of bearers associated to the multicast or broadcast service and
   wherein the service description information further indicates predetermined bearer combinations among the plurality of bearers, each predetermined bearer combination comprising at least one of said plurality of bearers and each predetermined bearer combination providing the multicast or broadcast service at predetermined quality of service parameters,
   the receiver being adapted to receive service notification information in response to the activation of the plurality of bearers, wherein the service notification information indicates at least one bearer of said plurality of bearers being multicast or broadcast via the air interface of radio access network,
   a transmitter for activating the plurality of bearers associated to the multicast or broadcast service, and
   a processing means for determining whether the at least one bearer indicated in the received service notification information corresponds to one of said predetermined bearer combinations,
   wherein the receiver is adapted to receive content data of the multicast or broadcast service via said at least one bearer indicated in the service notification information, if the processing means has determined that the at least one bearer indicated in the received service notification information corresponds to one of said predetermined bearer combinations, and
   the mobile terminal comprised is adapted to provide the content data to the user of the mobile terminal,
   said mobile terminal further comprising means adapted to perform the steps of the method according to claim 2.

4. A computer readable medium storing instructions that, when executed by a processor of a mobile terminal, cause the provision of a multicast or broadcast service to the user of the mobile terminal via a radio access network of a mobile communication system, the multicast or broadcast service being associated to a plurality of bearers for providing the multicast or broadcast service, by:
   receiving a service description information for the multicast or broadcast service, wherein the service description information indicates the plurality of bearers associated to the multicast or broadcast service and
   wherein the service description information further indicates predetermined bearer combinations among the plurality of bearers, each predetermined bearer combination comprising at least one of said plurality of bearers and each predetermined bearer combination providing the multicast or broadcast service at predetermined quality of service parameters,
   activating the plurality of bearers associated to the multicast or broadcast service,
   receiving service notification information in response to the activation of the plurality of bearers, wherein the service notification information indicates at least one bearer of said plurality of bearers being multicast or broadcast via the air interface of radio access network,
   determining whether the at least one bearer indicated in the received service notification information corresponds to one of said predetermined bearer combinations, and
   if so, receiving content data of the multicast or broadcast service via said at least one bearer indicated in the service notification information and providing the content data to the user of the mobile terminal,
   said computer readable medium further storing instructions that, when executed by the processor of the mobile terminal, cause the mobile terminal to execute the steps of the method according to claim 2.

5. The method according to claim 1 further comprising the step of providing an error message to the user of the mobile terminal, if the at least one bearer indicated in the received service notification information does not correspond to one of said predetermined bearer combinations.

6. The method according to claim 1 further comprising the steps of waiting for the reception of further service notification information before providing the content data of the multicast or broadcast service to the user of the mobile terminal, if the at least one bearer indicated in the received service notification information does not correspond to one of said predetermined bearer combinations, and
    providing an error message to the user of the mobile terminal, if no further service notification information is received within a predetermined time span.

7. The method according to claim 1 wherein the service notification information further indicates parameters required for receiving the at least one bearer by the mobile terminal.

8. The method according to claim 1 wherein a markup language is used to describe to content of the service description information.

9. The method according to claim 8, wherein the service description information comprises tags defining said predetermined bearer combinations.

10. The method according to claim 8 wherein the service description information comprises a tag indicating the relationship between the predetermined bearer combinations.

11. The method according to claim 1 wherein the service description information defines a priority for each of the predetermined bearer combinations.

12. The method according to claim 1 wherein the service notification information is received in at least one notification message.

13. The method according to claim 1 wherein the service notification information is received via a broadcast radio channel.

14. The method according to claim 1 wherein the service description information is comprised in a user service description and a service description for each bearer of said plurality of bearers separately provided to the mobile terminal.

15. The method according to claim 14, wherein the user service description indicates an URI of each of the service descriptions associated to said plurality of bearers and defines the predetermined bearer combinations based on the URIs and
    wherein each service description for a respective one of said plurality of bearers comprises a temporary identifier of the respective bearer.

16. The method according to claim 15, wherein the service notification information comprises the temporary identifier of each bearer comprised in said selected bearer combination.

17. A method providing a multicast or broadcast service to a mobile terminal via a radio access network of a mobile communication system, wherein the multicast or broadcast service is associated to a plurality of bearers for providing the multicast or broadcast service, the method comprising the following steps executed by a network entity of the radio access network controlling the radio resources on the air interface of the radio access network:
    receiving a service context information of the multicast or broadcast service from a network entity of the core network of the mobile communication network,
    wherein the service context information indicates the plurality of bearers associated to the multicast or broadcast service and wherein the service context information further indicates predetermined bearer combinations among the plurality of bearers, each predetermined bearer combination comprising at least one of said plurality of bearers and each predetermined bearer combination providing the multicast or broadcast service at a predetermined quality of service parameters,
    obtaining from a quality-of-service management function of the network entity quality-of-service constraints indicating a quality-of-service available for downstream transmission on the interface of the network entity through which the service request of the mobile terminal has been received,
    selecting a bearer combination from said predetermined bearer combinations providable within the quality-of-service constraints obtained from the quality-of-service management function based on the predetermined quality of service parameters for each of the predetermined bearer combination comprised in the service context information,
    transmitting service notification information indicating the selected bearer combination to the mobile terminal, and
    transmitting content data of the multicast or broadcast service to the mobile terminal via the at least one bearer of said selected bearer combination.

18. The method according to claim 17, further comprising the step of allocating radio resources for the transmission of content data via the bearers of said selected bearer combination.

19. A network entity for providing a multicast or broadcast service to a mobile terminal via a radio access network of a mobile communication system, wherein the multicast or broadcast service is associated to a plurality of bearers for providing the multicast or broadcast service, the network entity being located in the radio access network and adapted to control the radio resources on the air interface of the radio access network, the network entity comprising:
    a receiver for receiving a service context information of the multicast or broadcast service from a network entity of the core network of the mobile communication network,
    wherein the service context information indicates the plurality of bearers associated to the multicast or broadcast service and wherein the service context information further indicates predetermined bearer combinations among the plurality of bearers, each predetermined bearer combination comprising at least one of said plurality of bearers and each predetermined bearer combination providing the multicast or broadcast service at a predetermined quality of service parameters,
    processing means for obtaining from a quality-of-service management function of the network entity quality-of-service constraints indicating a quality-of-service available for downstream transmission on the interface of the network entity through which the service request of the mobile terminal has been received, and for selecting a bearer combination from said predetermined bearer combinations providable within the quality-of-service constraints obtained from the quality-of-service management function based on the predetermined quality of service parameters for each of the predetermined bearer combination comprised in the service context information, and
    a transmitter for transmitting service notification information indicating the selected bearer combination to the mobile terminal, and for transmitting content data of the multicast or broadcast service to the mobile terminal via the at least one bearer of said selected bearer combination,
    said network entity further comprising means adapted to perform the steps of the method according to claim 18.

20. A computer readable medium storing instructions that, when executed by a processor of a network entity, cause the network entity to provide a multicast or broadcast service to a mobile terminal via a radio access network of a mobile communication system, the multicast or broadcast service being associated to a plurality of bearers for providing the multicast or broadcast service, the network entity being located in the radio access network and controlling the radio resources on the air interface of the radio access network, by:

receiving a service context information of the multicast or broadcast service from a network entity of the core network of the mobile communication network, wherein the service context information indicates the plurality of bearers associated to the multicast or broadcast service and wherein the service context information further indicates predetermined bearer combinations among the plurality of bearers, each predetermined bearer combination comprising at least one of said plurality of bearers and each predetermined bearer combination providing the multicast or broadcast service at a predetermined quality of service parameters, obtaining from a quality-of-service management function of the network entity quality-of-service constraints indicating a quality-of-service available for downstream transmission on the interface of the network entity through which the service request of the mobile terminal has been received, selecting a bearer combination from said predetermined bearer combinations providable within the quality-of-service constraints obtained from the quality-of-service management function based on the predetermined quality of service parameters for each of the predetermined bearer combination comprised in the service context information, transmitting service notification information indicating the selected bearer combination to the mobile terminal, and transmitting content data of the multicast or broadcast service to the mobile terminal via the at least one bearer of said selected bearer combination, said computer readable medium further storing instructions that, when executed by the processor of the network entity, cause the network entity to execute the steps of the method according to claim 18.

21. The method according to claim 17 further comprising the steps of relaying service description information for the multicast or broadcast service to the mobile terminal, wherein the service description information indicates the plurality of bearers associated to the multicast or broadcast service and wherein the service description information further indicates predetermined bearer combinations among the plurality of bearers, each predetermined bearer combination comprising at least one of said plurality of bearers and each predetermined bearer combination providing the multicast or broadcast service at predetermined quality of service parameters.

22. The method according to claim 17 further comprising the steps of monitoring the quality-of-service constraints indicating the quality-of-service available for downstream transmission for the interface of the network entity through which the service request of the mobile terminal has been received utilizing the quality-of-service management function of the network entity, determining whether the monitored quality-of-service constraints still allow for providing the selected bearer combination to the mobile terminal, and if not, selecting another bearer combination from said predetermined bearer combinations providable within the quality-of-service constraints obtained from the quality-of-service management function based on the predetermined quality of service parameters for each of the predetermined bearer combination comprised in the service context information, transmitting service notification information indicating the selected other bearer combination to the mobile terminal, and transmitting content data of the multicast or broadcast service to the mobile terminal via the at least one bearer of said selected other bearer combination.

23. The method according to claim 22, further comprising the steps of allocating radio resources for the transmission of content data via the bearers of said selected other bearer combination and freeing the radio resources that have been previously allocated for the transmission of content data of said multicast and broadcast service.

24. The method according to claim 17 further comprising the step of receiving an indication on the start of the multicast or broadcast service from a core network node of the mobile communication network, and wherein the notification information and/or resource reservation in the radio access network is performed after having received the indication on the start of the multicast or broadcast service.

25. A mobile terminal for providing a multicast or broadcast service to a user, the multicast or broadcast service being transmitted via a radio access network of a mobile communication system, wherein the multicast or broadcast service is associated to a plurality of bearers for providing the multicast or broadcast service, the mobile terminal comprising:

a receiver for receiving a service description information for the multicast or broadcast service, wherein the service description information indicates the plurality of bearers associated to the multicast or broadcast service and wherein the service description information further indicates predetermined bearer combinations among the plurality of bearers, each predetermined bearer combination comprising at least one of said plurality of bearers and each predetermined bearer combination providing the multicast or broadcast service at predetermined quality of service parameters, the receiver being adapted to receive service notification information in response to the activation of the plurality of bearers, wherein the service notification information indicates at least one bearer of said plurality of bearers being multicast or broadcast via the air interface of radio access network, a transmitter for activating the plurality of bearers associated to the multicast or broadcast service, and a processing means for determining whether the at least one bearer indicated in the received service notification information corresponds to one of said predetermined bearer combinations, wherein the receiver is adapted to receive content data of the multicast or broadcast service via said at least one bearer indicated in the service notification information, if the processing means has determined that the at least one bearer indicated in the received service notification information corresponds to one of said predetermined bearer combinations, and the mobile terminal comprised is adapted to provide the content data to the user of the mobile terminal.

26. A network entity for providing a multicast or broadcast service to a mobile terminal via a radio access network of a mobile communication system, wherein the multicast or broadcast service is associated to a plurality of bearers for providing the multicast or broadcast service, the network entity being located in the radio access network and adapted to control the radio resources on the air interface of the radio access network, the network entity comprising:
- a receiver for receiving a service context information of the multicast or broadcast service from a network entity of the core network of the mobile communication network,
- wherein the service context information indicates the plurality of bearers associated to the multicast or broadcast service and wherein the service context information further indicates predetermined bearer combinations among the plurality of bearers, each predetermined bearer combination comprising at least one of said plurality of bearers and each predetermined bearer combination providing the multicast or broadcast service at a predetermined quality of service parameters,
- processing means for obtaining from a quality-of-service management function of the network entity quality-of-service constraints indicating a quality-of-service available for downstream transmission on the interface of the network entity through which the service request of the mobile terminal has been received, and for selecting a bearer combination from said predetermined bearer combinations providable within the quality-of-service constraints obtained from the quality-of-service management function based on the predetermined quality of service parameters for each of the predetermined bearer combination comprised in the service context information, and
- a transmitter for transmitting service notification information indicating the selected bearer combination to the mobile terminal, and for transmitting content data of the multicast or broadcast service to the mobile terminal via the at least one bearer of said selected bearer combination.

27. A computer readable medium storing instructions that, when executed by a processor of a mobile terminal, cause the provision of a multicast or broadcast service to the user of the mobile terminal via a radio access network of a mobile communication system, the multicast or broadcast service being associated to a plurality of bearers for providing the multicast or broadcast service, by:
- receiving a service description information for the multicast or broadcast service, wherein the service description information indicates the plurality of bearers associated to the multicast or broadcast service and
- wherein the service description information further indicates predetermined bearer combinations among the plurality of bearers, each predetermined bearer combination comprising at least one of said plurality of bearers and each predetermined bearer combination providing the multicast or broadcast service at predetermined quality of service parameters,
- activating the plurality of bearers associated to the multicast or broadcast service,
- receiving service notification information in response to the activation of the plurality of bearers, wherein the service notification information indicates at least one bearer of said plurality of bearers being multicast or broadcast via the air interface of radio access network,
- determining whether the at least one bearer indicated in the received service notification information corresponds to one of said predetermined bearer combinations, and
- if so, receiving content data of the multicast or broadcast service via said at least one bearer indicated in the service notification information and providing the content data to the user of the mobile terminal.

28. A computer readable medium storing instructions that, when executed by a processor of a network entity, cause the network entity to provide a multicast or broadcast service to a mobile terminal via a radio access network of a mobile communication system, the multicast or broadcast service being associated to a plurality of bearers for providing the multicast or broadcast service, the network entity being located in the radio access network and controlling the radio resources on the air interface of the radio access network, by:
- receiving a service context information of the multicast or broadcast service from a network entity of the core network of the mobile communication network,
- wherein the service context information indicates the plurality of bearers associated to the multicast or broadcast service and wherein the service context information further indicates predetermined bearer combinations among the plurality of bearers, each predetermined bearer combination comprising at least one of said plurality of bearers and each predetermined bearer combination providing the multicast or broadcast service at a predetermined quality of service parameters,
- obtaining from a quality-of-service management function of the network entity quality-of-service constraints indicating a quality-of-service available for downstream transmission on the interface of the network entity through which the service request of the mobile terminal has been received,
- selecting a bearer combination from said predetermined bearer combinations providable within the quality-of-service constraints obtained from the quality-of-service management function based on the predetermined quality of service parameters for each of the predetermined bearer combination comprised in the service context information,
- transmitting service notification information indicating the selected bearer combination to the mobile terminal, and
- transmitting content data of the multicast or broadcast service to the mobile terminal via the at least one bearer of said selected bearer combination.

* * * * *